(12) United States Patent
Hiestand

(10) Patent No.: US 9,561,545 B2
(45) Date of Patent: Feb. 7, 2017

(54) CLAMPING DEVICE

(71) Applicant: Karl Hiestand, Pfullendorf (DE)

(72) Inventor: Karl Hiestand, Pfullendorf (DE)

( * ) Notice: Subject to any disclaimer, the term of this patent is extended or adjusted under 35 U.S.C. 154(b) by 354 days.

(21) Appl. No.: 14/063,381

(22) Filed: Oct. 25, 2013

(65) Prior Publication Data

US 2014/0117631 A1    May 1, 2014

(30) Foreign Application Priority Data

Oct. 26, 2012   (EP) .................................... 12190075

(51) Int. Cl.
*B23B 31/28* (2006.01)
*B23B 31/26* (2006.01)
*B23B 31/175* (2006.01)

(52) U.S. Cl.
CPC ......... *B23B 31/26* (2013.01); *B23B 31/16225* (2013.01); *B23B 31/16229* (2013.01); *B23B 31/28* (2013.01); *Y10T 279/27* (2015.01)

(58) Field of Classification Search
CPC .................. B23B 31/16225; B23B 31/16229; B23B 31/28; Y10T 279/27
See application file for complete search history.

(56) References Cited

U.S. PATENT DOCUMENTS

| | | | |
|---|---|---|---|
| 4,567,794 A | 2/1986 | Bald | |
| 2002/0158520 A1 | 10/2002 | Takamune et al. | |
| 2006/0027980 A1* | 2/2006 | Hiestand | B23B 31/28 279/119 |
| 2015/0113790 A1* | 4/2015 | Hiestand | B23B 31/28 29/559 |

FOREIGN PATENT DOCUMENTS

| | | |
|---|---|---|
| EP | 2384839 | 11/2011 |
| JP | S58217354 | 12/1983 |
| JP | H11-300512 | 11/1999 |
| JP | 3059415 | 7/2000 |
| JP | 2004291191 | 10/2004 |
| JP | 2006043876 | 2/2006 |
| JP | 3774806 | 5/2006 |
| JP | 2008023608 | 2/2008 |
| JP | 2008049474 | 3/2008 |
| JP | 4337039 | 9/2009 |
| JP | 5449251 | 3/2014 |

* cited by examiner

*Primary Examiner* — Eric A Gates
*Assistant Examiner* — Paul M Janeski
(74) *Attorney, Agent, or Firm* — Pandiscio & Pandiscio

(57) ABSTRACT

A clamping device for machine tools with a power-operated chuck, the clamping jaws of which are actuatable by the clamping device via a movement converter and draw rod. A drive motor is provided with a switching element which is adjustable by axial control in a middle and two limit positions, wherein the switching element is connectable to the clamping device in one limit position and, in the other limit position, to an adjustment element connectable to an auxiliary device. The switching element is lockable in the limit positions with a machine spindle. The clamping device is thereby provided with an increased range of applications, without functions being impaired, with little structural complexity, because the switching element makes possible a clamping element integrated in the power operated chuck to be operated using the drive motor, such that further procedures can be undertaken without changing the clamping device.

21 Claims, 5 Drawing Sheets

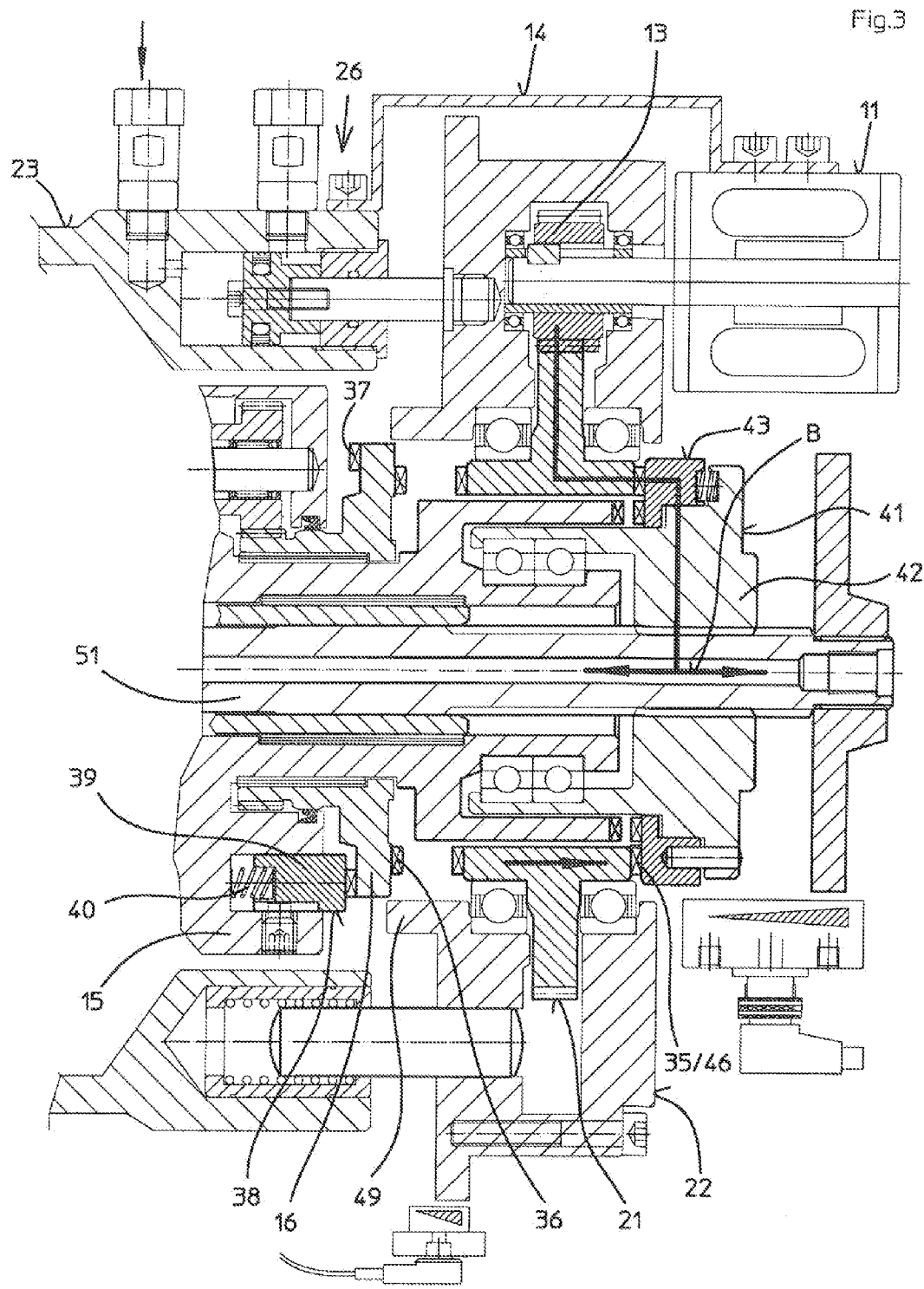

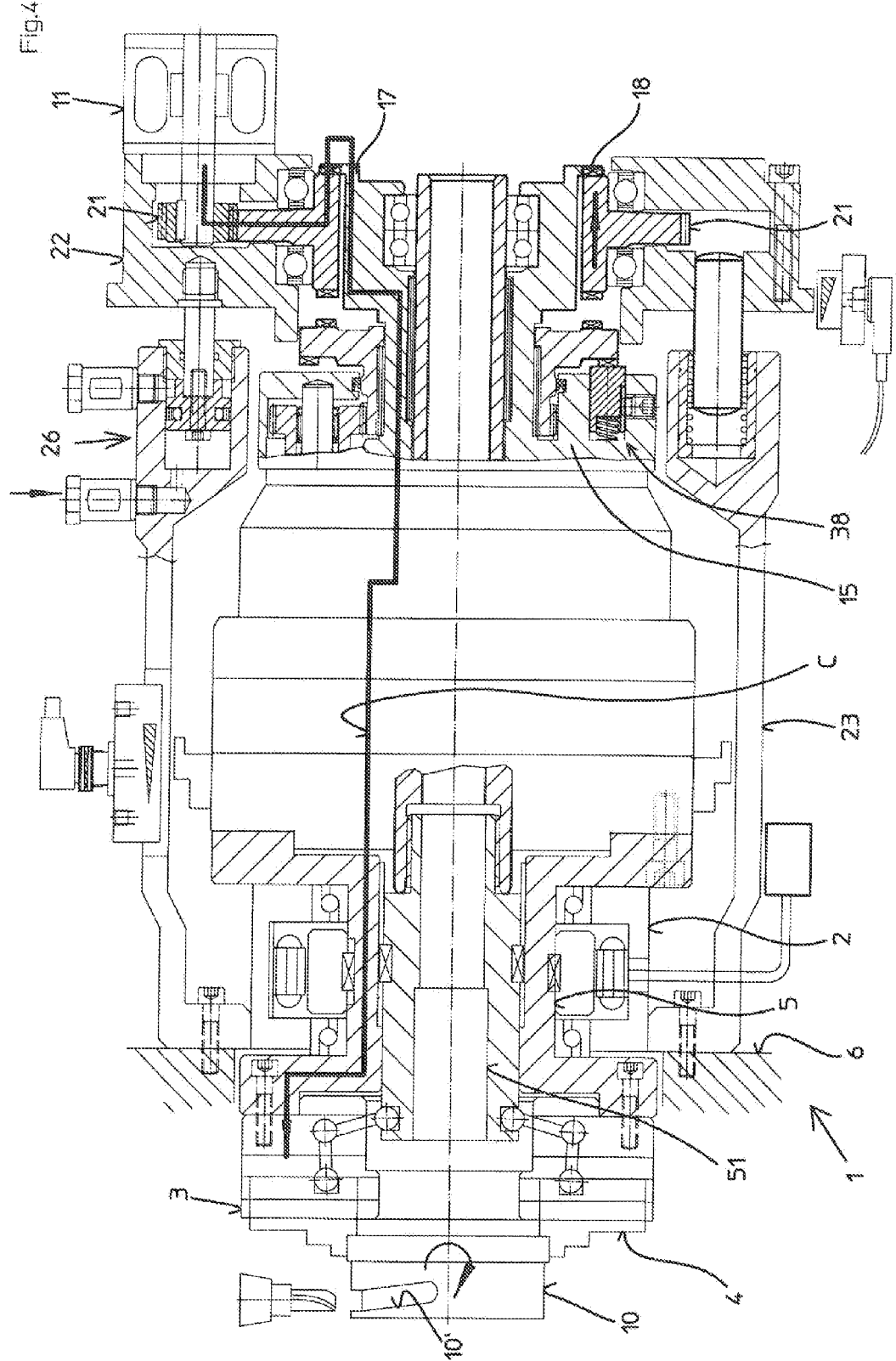

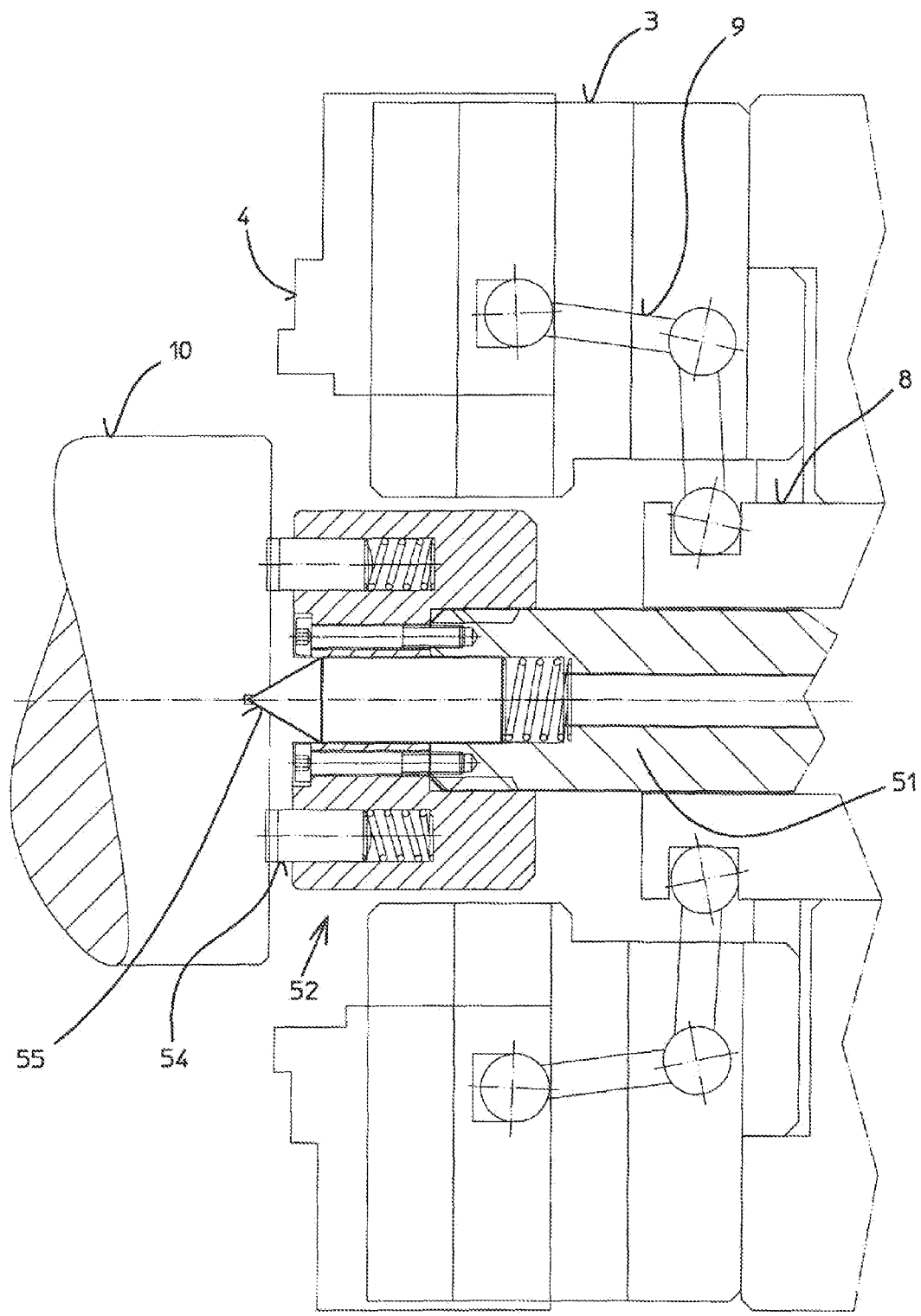

CLAMPING DEVICE

BACKGROUND OF THE INVENTION

1. Field of the Invention

The present invention relates to a clamping device for machine tools, the device comprising a power-operated chuck for holding a workpiece, and clamping jaws that can be actuated using the clamping device by means of a movement converter and an axially moveable draw rod, wherein the clamping device includes an electric drive motor with a changeover function connectable to the movement converter for triggering clamping movements.

2. Description of the Prior Art

A device for the releasable connection of a workpiece carrier configured as a power-operated chuck with an actuating element is disclosed in EP 0344451 A1, in which is two pneumatically operated servo devices arranged coaxially, one after another, are provided and comprise pistons disposed in cylinders and adapted to change the power-operated chuck within a short time. In this case, the piston rod of the actuating element of one servo device can act on the clamping jaws of the power-operated chuck by means of wedge hooks. The piston rod of the other servo device, on the other hand, is connected to a coupling element by means of another axially movable draw rod. Releasing and restoring the driving connection between the actuating element of one servo device, and a clamping piston arranged in the power-operated chuck, is undertaken by means of an actuating element provided with a special configuration allocated to the second servo device.

The connection between the actuating element and the clamping piston of the power-operated chuck can be reliably established, or released, by means of the further adjustment element, although this involves considerable structural complexity. In addition, the servo devices arranged axially, one after another, require a relatively large space, which means the application range of this fixture of the prior art is restricted to the specified purpose.

SUMMARY OF THE INVENTION

The object of the present invention is, therefore, to create a clamping device of the aforementioned type such that the functions, and thus the range of application, of the clamping device, are considerably extended. Above all, it should be possible for the operating method of an electrically operated clamping device to be supplemented by exploiting the existing components, such as the drive motor, in order to operate additional auxiliary devices. As a result, the drive motor of the clamping device should, for example, make it possible to adjust or drive a central stop in the power-operated chuck, or a rotary driver, without unfavourably influencing the function of the clamping device. Accordingly, and with low structural complexity, a clamping device configured in accordance with the present invention renders it possible to undertake additional working procedures in order to increase its value.

In accordance with the present invention, this is achieved in a clamping device of the aforementioned type wherein the drive motor is provided with a switching element which can be adjusted by axial control in a middle position, and in one or both limit positions, and which can be driven directly or via intermediate elements, and the switching element is connectable in a positive or non-positive arrangement to components of the clamping device in one limit position, and to an axially movable adjustment element in the other limit position, in which case the adjustment element can be connected to an auxiliary device of the machine tool, or can be connected to the power-operated chuck in order to rotate the power-operated chuck in a position-oriented manner, the rotationally fixed connection being effected by means of components of the clamping device, and the switching element is adapted to be locked and unlocked on the machine spindle of the machine tool in one or both limit positions.

In this case, it is advantageous for the switching element to be mounted so as to rotate in a housing, preferably configured in two parts, as an intermediate piece which is connected to the spindle stock of the machine tool in a rotationally fixed arrangement, whilst allowing controlled axial movement, in which case it is supported on several guide pins arranged in a preferred embodiment evenly around the circumference and are inserted in a movable arrangement in locationally fixed carriers, or carriers that are attached to the spindle stock.

For controlled axial movement of the housing accommodating the switching element, it is appropriate for a servo device to be provided in the form of a piston in a cylinder to which pressurised fluid can be applied from both sides, a piston rod of the piston being in a driveable connection with the switching element.

In this case, the drive motor can be supported in a fixed location on the housing, or on one of the carriers connected to the spindle stock, and the drive shaft of the drive motor is connected, or adapted to be connected, to the switching element in a positive-locking arrangement.

In the operating position of the clamping device, it should be possible to lock and unlock it on the bell housing accommodating its components and in a rotationally fixed connection with the machine spindle, in order to exclude automatic release of a clamped workpiece.

To achieve positive connections between the clamping device and the bell housing, it is preferred that one or more spring detents be inserted in it, or in an intermediate element, in which case the spring detents can be released in the limit positions of the switching element by means of stops formed on the switching element, or on the housing, or directly by means of the switching element.

In both limit positions, it should be possible to connect the switching element in a positive and non-positive connection to the clamping device, or the intermediate element configured as a nut, with the connection being established by helical gearing or friction pads attached to sides of the switching element, in which case the intermediate element is in driving connection with the adjustment element by means of threads for converting the rotational movements of the drive motor into axial adjustment movements.

It is also preferred that the intermediate element be configured as a two-piece ring disc, both parts of which are mounted on one another in a rotationally fixed and movable arrangement, with one or more compression springs arranged between them, such that the part of the ring that interacts with the switching element forms the spring detent.

Furthermore, it is advantageous for the switching element to be connected to an input element of the clamping device, or the bell housing, and/or the intermediate element, and/or for it to be connected to the bell housing in a positive arrangement by means of helical gearing.

It is advantageous for the switching element to be configured with an inverted T-shaped cross section, in which case a leg pointing radially outwards can be connected to the drive motor, with the helical gearing on its legs extending horizontally.

In order to ascertain the particular operating condition of the allocated component, the housing, and/or the intermediate element, and/or the clamping device, may be provided with position measuring devices.

The movement converter of the clamping device may be formed by several ball or planetary roller spindles arranged at a distance from the longitudinal axis of the clamping device and evenly around the circumference, while the auxiliary devices that can be actuated by the adjustment element can be configured as axially adjustable stops, as a rotary driver, or as a centre punch tip.

If a clamping device in accordance with the present invention is additionally equipped with a switching element, it is possible to use the drive motor of the clamping device not only for driving the clamping device in the necessary way, but also for operating variously configured auxiliary devices, with the effect that the clamping device can be used for additional working procedures. The switching element enables driving connections to be established without difficulty, and in a short time, with the auxiliary devices bypassing the clamping device, without the function of the clamping device being impaired thereby. The structural complexity required for this is small. Also, the structural size is not unfavourably influenced. Accordingly, several working procedures can be carried out without problems on one machine tool without having to change clamping devices. At the same time, safe operation of the clamping device is provided at all times, because it can easily be neutralised with the help of the switching element in operating conditions in which an auxiliary device is used.

BRIEF DESCRIPTION OF THE DRAWINGS

The drawings show an illustrative embodiment of a clamping device configured in accordance with the present invention, the details of which are explained below. In the drawings:

FIGS. 2 and 3 each show a section from FIG. 1 in an enlarged view, in both limit positions of the switching element;

FIG. 4 shows an alternative embodiment with a power-operated chuck adapted to be driven in a controlled fashion; and FIG. 5 shows differently configured auxiliary devices adapted to be used with the clamping device of FIG. 1, in an enlarged view.

DESCRIPTION OF THE PREFERRED EMBODIMENTS

Figure 1:
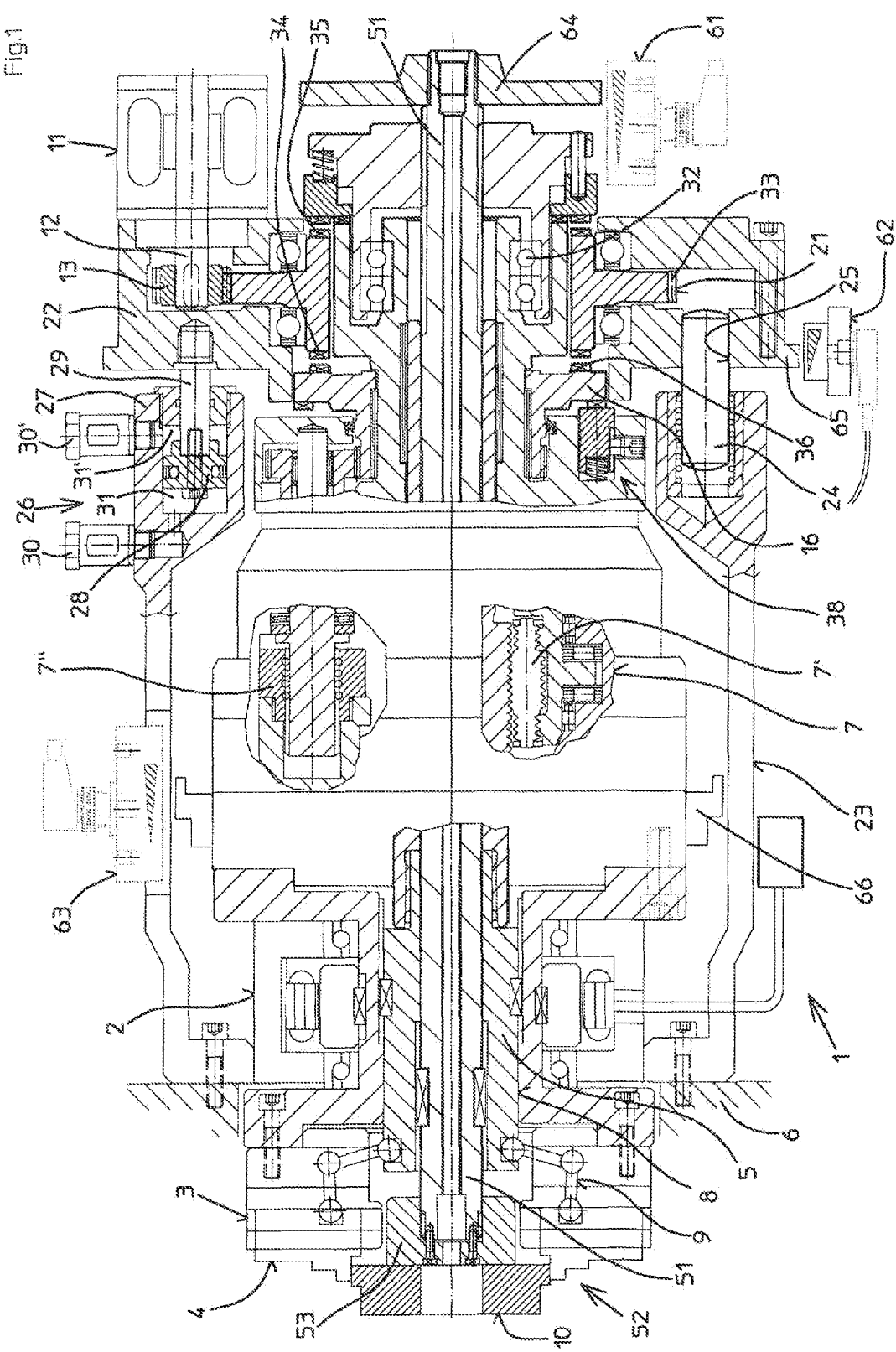
FIG. 1 is a generally sectional in part elevational view of a clamping device with a clamped workpiece, and a switching element allocated to a drive motor, in a partial section and elevation, in the middle position of the switching element.

The clamping device 1 illustrated in FIGS. 1 to 5 is used for actuating a power-operated chuck 3 arranged on a machine tool 2, by means of radially adjustable clamping jaws 4 such that a workpiece 10 to be machined can be clamped in the power-operated chuck 3 in a releasable manner. The clamping jaws 4 are actuated via relay levers 9 (FIG. 1) by an axially adjustable draw rod 8 in driving connection with an electric drive motor 11 having a change-over function by means of a movement converter 7. The movement converter 7, shown in section, may comprise several ball roller spindles 7' or planetary roller spindles 7", and converts rotational adjustment movements of the drive motor 11 into an axial adjustment movement of the draw rod 8.

The clamping device 1 is arranged on a machine spindle 5 of the machine tool 2, and is connected via this with the power-operated chuck 3 that projects from a spindle stock 6. Configurations of the clamping device 1 can be selected, such as those disclosed in EP 2 382 839 A1 and EP 11174513.9.

In order to allow the clamping device 1 to be used additionally in working procedures, other than those that are normally allocated to it, the drive motor 11 is provided with a switching element 21, adapted for axially controlled movement, which can be adjusted by means of a servo device 26, and can be locked in the middle position, as well as in both limit positions. In the embodiment shown in FIG. 1, the drive motor 11 is flange-mounted on a two-piece housing 22 for this purpose, in which the switching element 21 is disposed and is movably mounted on guide pins 24 that engage in holes 25 (FIG. 1) disposed in the housing 22, and are attached to carriers 23. The carriers 23, in turn, are supported on the spindle stock 6, and to one of the carriers 23 the servo device 26 attached, acts on the housing 22 in which the switching element 21 is mounted in a rotating arrangement by means of anti-friction bearings 32 (FIG. 1). For this purpose, a piston rod 29 of a piston 28 inserted in a cylinder 27 (FIG. 1) is firmly connected to the housing 22, with the effect that when pressurised fluid is supplied via supply lines 30 or 30' into one of the pressure chambers 31 or 31', the housing 22, and with it the switching element 21, can be moved from the middle position shown in FIG. 1 to one of the two limit positions shown in FIG. 2 or 3.

Figure 2:
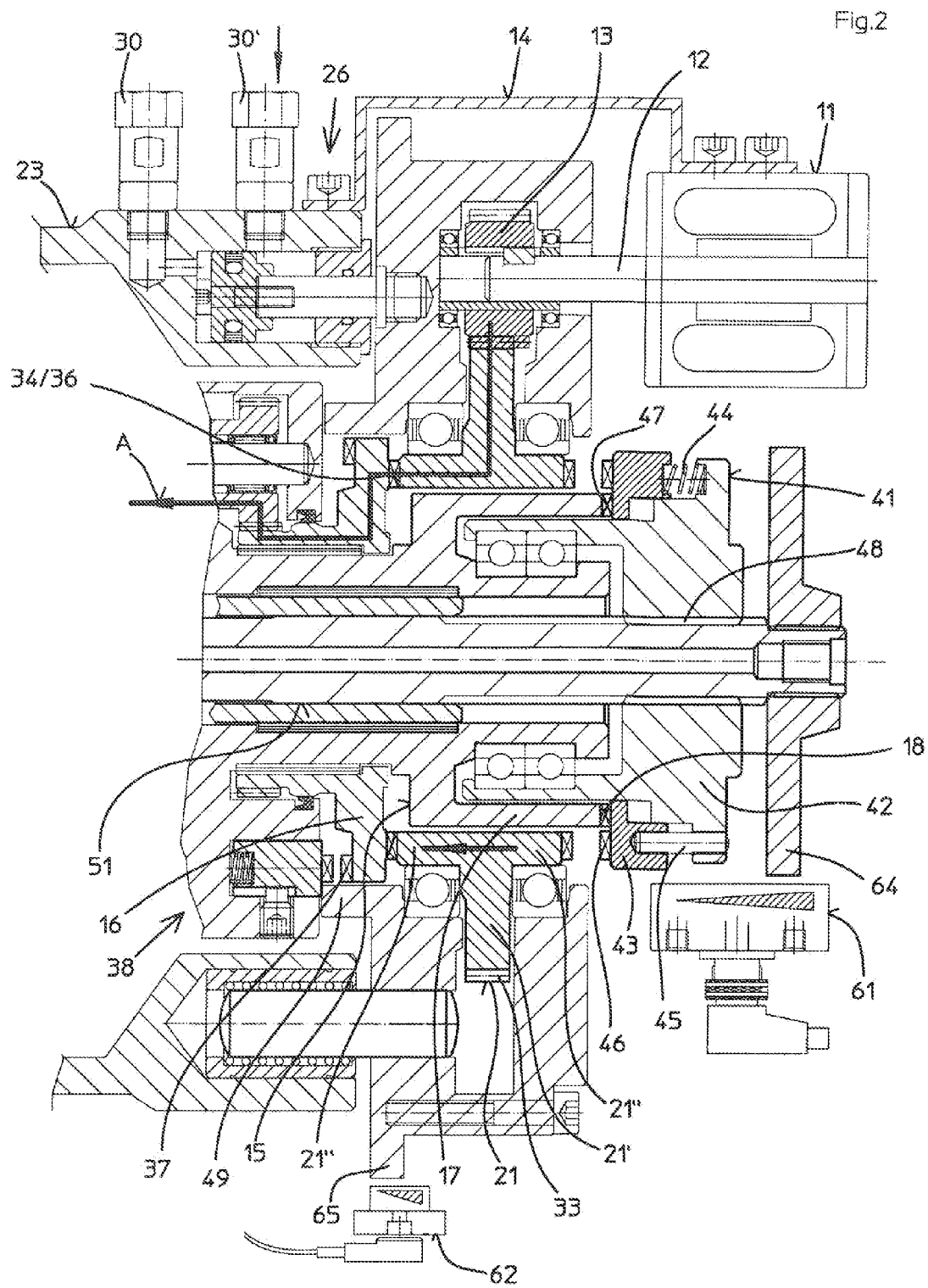

The switching element 21 is provided with an inverted T-shaped cross section, with gearing 33 disposed on its outwardly projecting leg 21' (FIG. 2) and a pinion 13 arranged on an output shaft 12 of the drive motor 11 engaging in the gearing 33. Two legs 21" (FIG. 2), running horizontally, are also provided with helical gearing 34 and 35 (FIG. 1), and interact in order to create various operating conditions, such as shown in FIGS. 2 and 3, involving components of the clamping device 1, or an adjustment element 51 (FIG. 1).

In the embodiment shown in FIG. 1, the drive motor 11 is firmly mounted on the housing 22 and can be moved under axial control. In accordance with FIGS. 2 and 3, however, the drive motor 11 can also be suspended in a fixed position on a bar 14 that is attached to one of the carriers 23. The output shaft 12 of the drive motor 11 is mounted in the pinion 13 in a movable arrangement in this embodiment.

In the middle position of the switching element 21, shown in FIG. 1, the clamping device is firmly connected to the machine spindle 5 so that the clamping jaws 4 of the power-operated chuck 3 retain the position they have adopted, and the workpiece 10 clamped in them can be machined. The clamping force required for this is input into the power-operating chuck 3 in advance in the operating position shown in FIG. 2. In this case, a powerflow exists between the drive motor 11 and the power-operated chuck 3 in accordance with the line A (FIG. 2). The helical gearing 34 of the switching element 21 is engaged in this operating condition in gearing 36 on a component 16 in a rotationally fixed connection with a bell housing 15.

In order to preclude automatic release of the power-operated chuck 3 in the operating conditions shown in FIG. 1, it is necessary to block the clamping device 1. This is achieved in that the component 16 inserted in the driveline of the clamping device 1 is provided with helical gearing 37

(FIG. 2), and several spring detents 38 are inserted into the bell housing 15 connected to the machine spindle 5, in which case the spring detents 38 interact with the helical gearing 37. The spring detents 38 are formed by pins 39 that are moveable against the force of compression springs 40, and are provided with gearing adapted to engage in the helical gearing 37, this means the adjustable components of the clamping device are firmly connected to the machine spindle 5 and are blocked by the bell housing 15. In order to release this connection, the stops 49 are formed onto the adjustable housing 22, by means of which the spring detents 38 can be disengaged, as shown in FIG. 2.

In the operating position shown in FIG. 3, the drive force of the drive motor 11, as indicated by line B, is vectored to the adjustment element 51, which is also configured in the form of a draw rod and acts on an auxiliary device 52 (FIG. 1). To make this possible, an intermediate element 41, in the form of a two-piece ring disc 42 and 43 (FIG. 2), is arranged on the adjustment element 51 to be moved axially, and acts as a nut being in a driven connection with the adjustment element 51 by means of a thread 48. Compression springs 44 (FIG. 2) are inserted between the two ring discs 42 and 43, which are held pushed together in a rotationally fixed arrangement by means of pins 45, with the effect that the ring disc 43 facing the switching element 21, which has two helical gearing profiles 46 and 47 (FIG. 2) disposed therein, functions as a spring detent 38.

As shown in FIG. 3, the gearing 46 of the ring disc 43 can be provided with the helical gearing 35 of the switching element 21 inserted into it. On the other hand, as shown in FIG. 2, the gearing 47 can effect a driving connection with the bell housing 15, as a result of which the auxiliary device 52 cannot be actuated in the neutral position of the switching element 21.

The auxiliary device 52 can be configured in different ways. According to FIGS. 1 and 5, it can be configured as a stop 53 with controlled adjustment, as a rotary driver 54, or a centre punch tip 55, as a result of which a machine tool 2 equipped with the clamping device 1 can be used for carrying out additional machining operations on a workpiece, as well as those that can be undertaken with the help of the clamping device 1. The auxiliary device 52 can also be configured as a clamping element that is integrated into the power-operated chuck 3.

The drive force of the drive motor 11 can also be input into the power-operated chuck 3 in the form of a rotational movement, for example to machine a groove 10' (FIG. 4), or bores, into the outer jacket surface of the workpiece 10. For this purpose, it is merely necessary to couple the switching element 21 in one limit position by means of the helical gearing 35 to the clamping device 1 that is locked by means of the spring detent 38, as shown in FIG. 4 (line C), by engaging the switching element 21 in gearing 18 worked into a projection 17 from the bell housing 15. This means the drive motor 11 is in a driving connection with the power-operated chuck 3, and it can be turned in a controlled way together with a clamped workpiece 10.

In order to ascertain the particular operating condition of individual components, several position measuring devices 61, 62 and 63 (FIG. 1) are allocated to the clamping device 1. The position measuring device 61 enables the adjustment travel of the adjustment element 51, which has a disc 64 attached to it, to be determined. The particular position of the housing 22, and thus of the switching element 21 inserted therein, can be determined by means of the position measuring device 62 that interacts with a ring-shaped projection 65 formed on the housing 22. A position measuring device 63 is also used for determining the position of components of the clamping device 1, which has a ring 66 attached to it for this purpose.

The invention claimed is:

1. A clamping device for machine tools, the clamping device being provided with a power-operated chuck for holding a workpiece and clamping jaws adapted to be actuated by means of a movement converter and an axially moveable draw rod,
    wherein the clamping device is provided with an electric drive motor, the electric drive motor being connectable to the movement converter for triggering clamping movements,
    wherein the electric drive motor is provided with a switching element which is adjustable by axial control between (i) a middle position in which the clamping device retains the clamping jaws in a clamped position around a workpiece so that the clamped workpiece can be machined, (ii) a first limit position for operating the power-operated chuck in a first operating condition, and (iii) a second limit position for operating an axially movable adjustment element in a second operating condition,
    wherein the adjustment element is connected to an auxiliary device of the machine tool, or is connected to the power-operated chuck for rotating the power-operated chuck in a position-oriented manner, and further wherein the switching element is adapted to be locked and unlocked on a machine spindle of the machine tool in one or both of the first and second limit positions.

2. The clamping device in accordance with claim 1, wherein the switching element is mounted so as to rotate in a housing as an intermediate piece connected to a spindle stock of the machine tool in a rotationally fixed arrangement whilst allowing controlled axial movement.

3. The clamping device in accordance with claim 2, wherein the housing is configured in two parts and is supported on guide pins arranged evenly around a circumference, the guide pins being disposed in a movable arrangement in locationally fixed carriers, or carriers that are attached to the spindle stock.

4. The clamping device in accordance with claim 3, wherein for controlled axial movement of the housing accommodating the switching element, a servo device is provided in the form of a piston inserted in a cylinder, wherein a pressurized fluid can be applied from both sides of the cylinder, and wherein a piston rod of the piston is in a driveable connection with the switching element.

5. The clamping device in accordance with claim 3, wherein the drive motor is supported in a fixed location on the housing, or on one of the carriers connected to the spindle stock, and a drive shaft of the drive motor is connectable to the switching element in a positive-locking arrangement.

6. The clamping device in accordance with claim 5, wherein in an operating position of the clamping device, the clamping device is lockable and unlockable to lock onto and unlock from a bell housing and in a rotationally fixed connection with the machine spindle.

7. The clamping device in accordance with claim 6, wherein to achieve positive connection between the clamping device and the bell housing, spring detent means are inserted in the bell housing or in an intermediate element, wherein the spring detents are adapted to be released in limit positions of the switching element by means of stops formed on the switching element or on the housing, or directly by means of the switching element.

8. The clamping device in accordance with claim 7, wherein in limit positions, the switching element is connectable to the clamping device, or to an intermediate element configured as a nut, with a connection effected by helical gearing, or by friction pads attached to sides of the switching element, in which case the intermediate element is in driving connection with the adjustment element by means of threads for converting rotational movements to axial adjustment movements.

9. The clamping device in accordance with claim 8, wherein the intermediate element comprises a two-piece ring disc, both pieces of which are mounted on one another in a rotationally fixed and movable arrangement, with at least one spring arranged therebetween such that a part of the ring that interacts with the switching element forms a spring detent.

10. The clamping device in accordance with claim 7, wherein the switching element is connected to an input element of the clamping device, and/or to the intermediate element, and/or to the bell housing by means of helical gearing.

11. The clamping device in accordance with claim 10, wherein the switching element is configured with an inverted T-shaped cross section, with a leg extending outwards and connectable to the drive motor, and wherein the helical gearing is on the leg extending horizontally.

12. The clamping device in accordance with claim 11, wherein selected ones of the housing, the intermediate element, and/or the clamping device are provided with position measuring devices in order to ascertain an operating condition of an allocated component.

13. The clamping device in accordance with claim 1, wherein the movement converter of the clamping device comprises a plurality of ball roller spindles disposed remote from a longitudinal axis of the clamping device, and evenly around a circumference thereof.

14. The clamping device in accordance with claim 1, wherein the auxiliary device actuatable by the adjustment element comprises a selected one of an axially adjustable stop, a rotary driver, a centre punch tip, and a clamping element integrated in the power-operated chuck.

15. The clamping device in accordance with claim 1 wherein the switching element is adjustable between the middle position, the first limit position and the second limit position by a servo device.

16. A clamping device for machine tools, the device being provided with a power-operated chuck for holding a workpiece, and clamping jaws adapted to be actuated using the clamping device by means of a movement converter and an axially moveable draw rod, wherein the clamping device is provided with an electric drive motor having a changeover function connectable to the movement converter for triggering clamping movements, wherein the drive motor is provided with a switching element which is adjustable by axial control in a middle position and in one or both limit positions, and which is driven directly or by intermediate elements, the switching element being connectable in a positive or non-positive arrangement to components of the clamping device, in particular the power-operated chuck, in one limit position, and to an axially movable adjustment element in the other limit position, wherein the adjustment element is connected to an auxiliary device of the machine tool, or is connected to the power-operated chuck in order to rotate the power-operated chuck in a position-oriented manner, the rotationally fixed connection being effected by means of components of the clamping device, and the switching element is adapted to be locked and unlocked on a machine spindle of the machine tool in one or both limit positions;

wherein the switching element is mounted so as to rotate in a housing as an intermediate piece connected to a spindle stock of the machine tool in a rotationally fixed arrangement whilst allowing controlled axial movement;

wherein the housing is configured in two parts and is supported on guide pins arranged evenly around a circumference, and are disposed in a movable arrangement in locationally fixed carriers, or carriers that are attached to the spindle stock;

wherein for controlled axial movement of the housing accommodating the switching element, a servo device is provided in the form of a piston inserted in a cylinder to which pressurised fluid can be applied from both sides, a piston rod of a piston being in a driveable connection with the switching element.

17. A clamping device for machine tools, the device being provided with a power-operated chuck for holding a workpiece, and clamping jaws adapted to be actuated using the clamping device by means of a movement converter and an axially moveable draw rod, wherein the clamping device is provided with an electric drive motor having a changeover function connectable to the movement converter for triggering clamping movements, wherein the drive motor is provided with a switching element which is adjustable by axial control in a middle position and in one or both limit positions, and which is driven directly or by intermediate elements, the switching element being connectable in a positive or non-positive arrangement to components of the clamping device, in particular the power-operated chuck, in one limit position, and to an axially movable adjustment element in the other limit position, wherein the adjustment element is connected to an auxiliary device of the machine tool, or is connected to the power-operated chuck in order to rotate the power-operated chuck in a position-oriented manner, the rotationally fixed connection being effected by means of components of the clamping device, and the switching element is adapted to be locked and unlocked on a machine spindle of the machine tool in one or both limit positions;

wherein the switching element is mounted so as to rotate in a housing as an intermediate piece connected to a spindle stock of the machine tool in a rotationally fixed arrangement whilst allowing controlled axial movement;

wherein the housing is configured in two parts and is supported on guide pins arranged evenly around a circumference, and are disposed in a movable arrangement in locationally fixed carriers, or carriers that are attached to the spindle stock;

wherein the drive motor is supported in a fixed location on the housing, or on one of the carriers connected to the spindle stock, and a drive shaft of the drive motor is connectable to the switching element in a positive-locking arrangement;

wherein in an operating position of the clamping device the clamping device is lockable and unlockable to lock onto and unlock from a bell housing and in a rotationally fixed connection with the machine spindle;

wherein to achieve positive connection between the clamping device and the bell housing, spring detent means are inserted therein, or in an intermediate element, the spring detents being adapted to be released in limit positions of the switching element by means of stops formed on the switching element, or on the housing, or directly by means of the switching element;

wherein in limit positions, the switching element is connectable to the clamping device, or the intermediate element configured as a nut, with a connection effected by helical gearing, or friction pads attached to sides of the switching element, in which case the intermediate element is in driving connection with an adjustment element by means of threads for converting rotational movements to axial adjustment movements.

18. The clamping device in accordance with claim 17, wherein the intermediate element comprises a two-piece ring disc, both pieces of which are mounted on one another in a rotationally fixed and movable arrangement, with at least one spring arranged therebetween such that a part of the ring that interacts with the switching element forms a spring detent.

19. A clamping device for machine tools, the device being provided with a power-operated chuck for holding a workpiece, and clamping jaws adapted to be actuated using the clamping device by means of a movement converter and an axially moveable draw rod, wherein the clamping device is provided with an electric drive motor having a changeover function connectable to the movement converter for triggering clamping movements, wherein the drive motor is provided with a switching element which is adjustable by axial control in a middle position and in one or both limit positions, and which is driven directly or by intermediate elements, the switching element being connectable in a positive or non-positive arrangement to components of the clamping device, in particular the power-operated chuck, in one limit position, and to an axially movable adjustment element in the other limit position, wherein the adjustment element is connected to an auxiliary device of the machine tool, or is connected to the power-operated chuck in order to rotate the power-operated chuck in a position-oriented manner, the rotationally fixed connection being effected by means of components of the clamping device, and the switching element is adapted to be locked and unlocked on a machine spindle of the machine tool in one or both limit positions;

wherein the switching element is mounted so as to rotate in a housing as an intermediate piece connected to a spindle stock of the machine tool in a rotationally fixed arrangement whilst allowing controlled axial movement;

wherein the housing is configured in two parts and is supported on guide pins arranged evenly around a circumference, and are disposed in a movable arrangement in locationally fixed carriers, or carriers that are attached to the spindle stock;

wherein the drive motor is supported in a fixed location on the housing, or on one of the carriers connected to the spindle stock, and a drive shaft of the drive motor is connectable to the switching element in a positive-locking arrangement;

wherein in an operating position of the clamping device the clamping device is lockable and unlockable to lock onto and unlock from a bell housing and in a rotationally fixed connection with the machine spindle;

wherein to achieve positive connection between the clamping device and the bell housing, spring detent means are inserted therein, or in an intermediate element, the spring detents being adapted to be released in limit positions of the switching element by means of stops formed on the switching element, or on the housing, or directly by means of the switching element;

wherein the switching element is connected to an input element of the clamping device, and/or the intermediate element, and/or to the bell housing by means of helical gearing.

20. The clamping device in accordance with claim 19, wherein the switching element is configured with an inverted T-shaped cross section, with a leg thereof extending outwards and connectable to the drive motor, and the helical gearing is on the leg extending horizontally.

21. The clamping device in accordance with claim 20, wherein selected ones of the housing, the intermediate element, and/or the clamping device, is provided with position measuring devices in order to ascertain an operating condition of an allocated component.

* * * * *